F. L. RAPSON.
LIFTING JACK AND THE LIKE FOR USE ON MOTOR ROAD AND OTHER VEHICLES.
APPLICATION FILED JUNE 11, 1919.

1,354,338.

Patented Sept. 28, 1920.
5 SHEETS—SHEET 1.

Inventor
Frederick Lionel Rapson
By
attorney

F. L. RAPSON.
LIFTING JACK AND THE LIKE FOR USE ON MOTOR ROAD AND OTHER VEHICLES.
APPLICATION FILED JUNE 11, 1919.
1,354,338.
Patented Sept. 28, 1920.
5 SHEETS—SHEET 2.
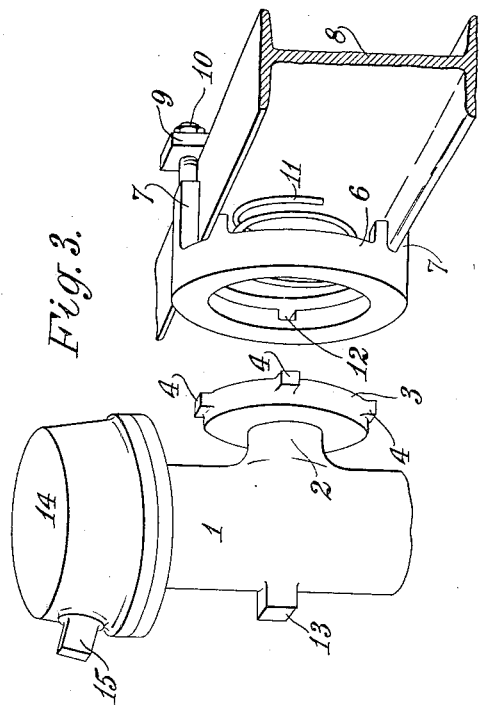
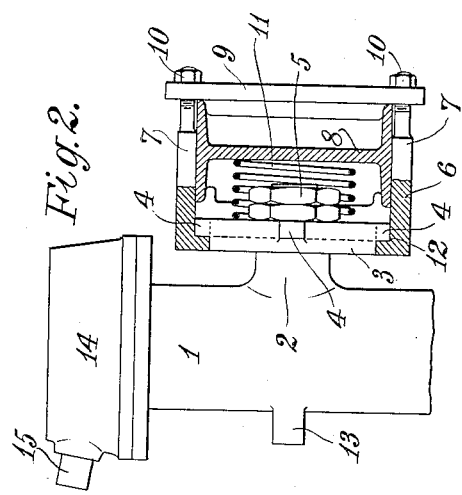
Inventor
Frederick Lionel Rapson
By
Attorney

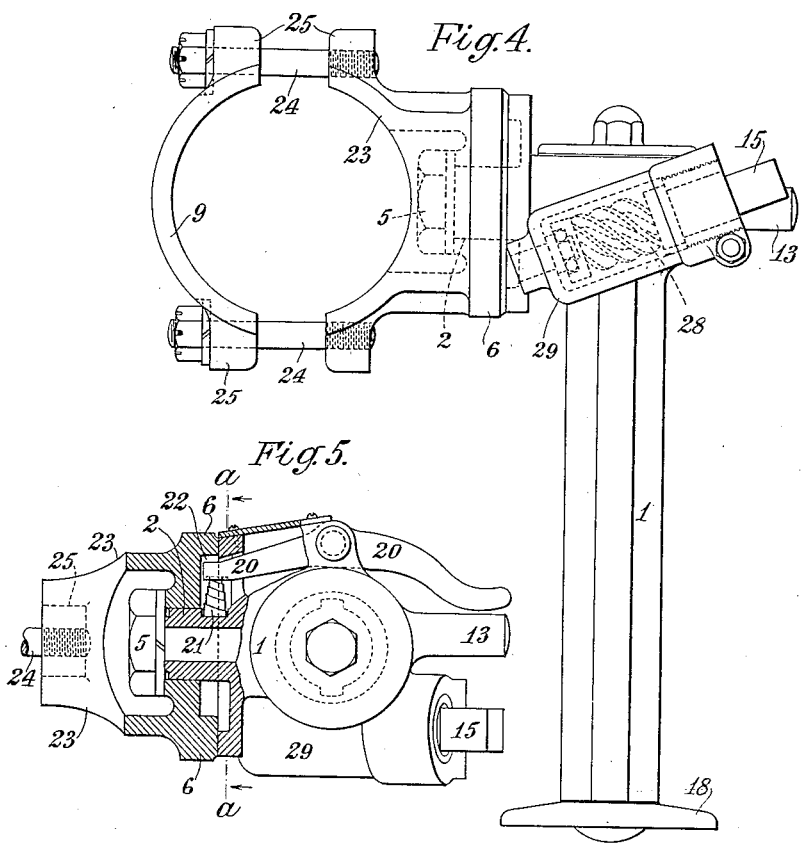

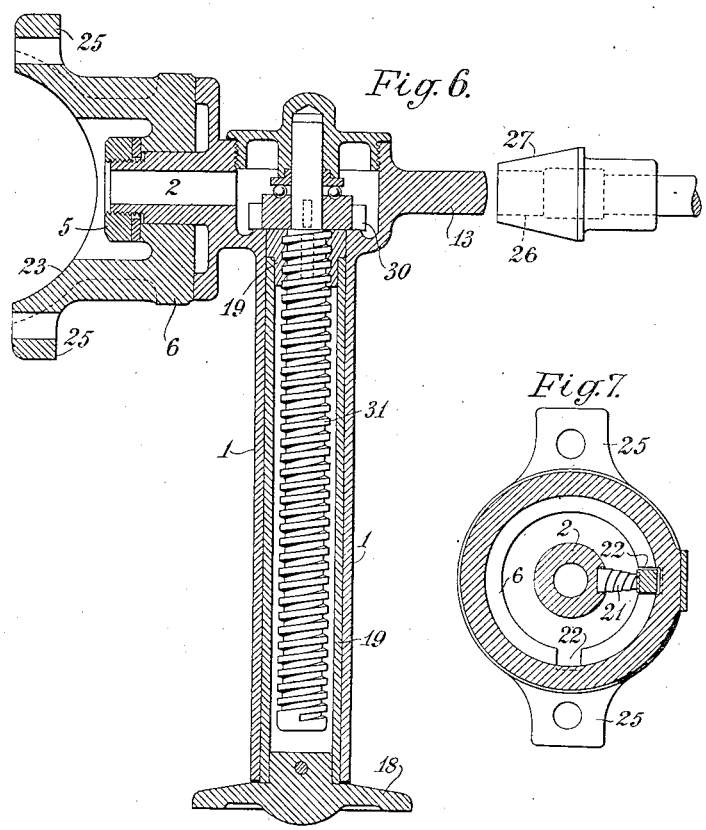

F. L. RAPSON.
LIFTING JACK AND THE LIKE FOR USE ON MOTOR ROAD AND OTHER VEHICLES.
APPLICATION FILED JUNE 11, 1919.
1,354,338.
Patented Sept. 28, 1920.
5 SHEETS—SHEET 5.
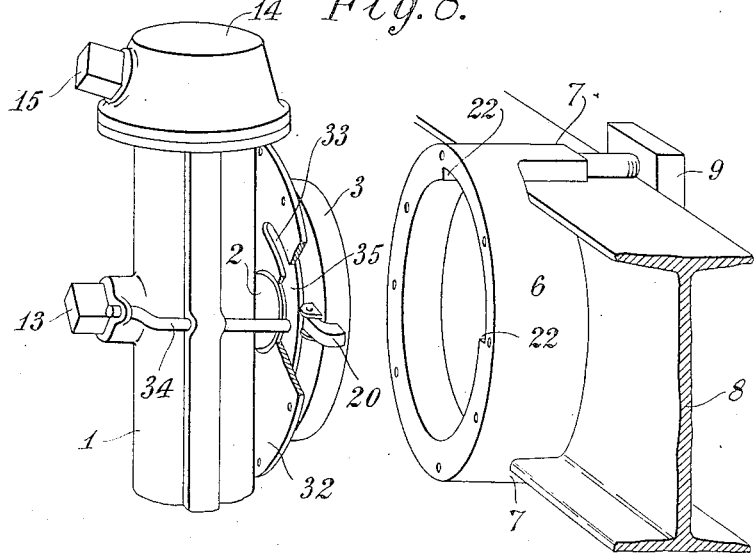
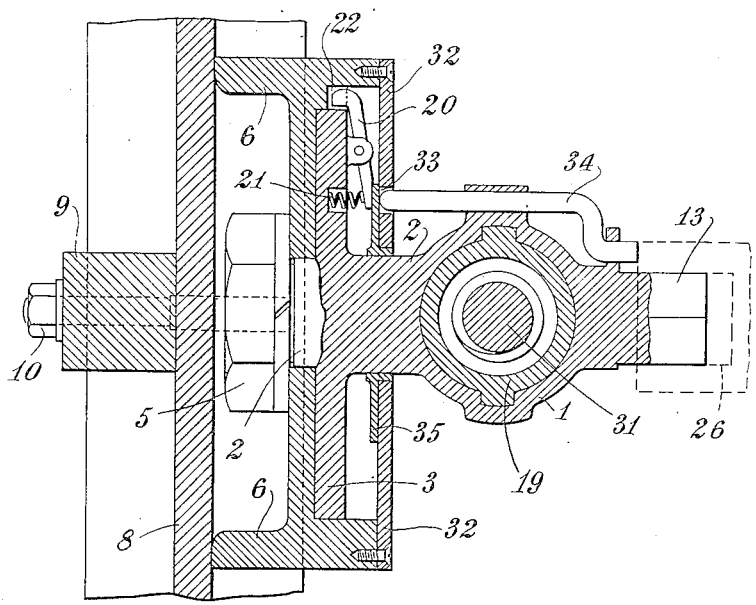
Inventor
Frederick Lionel Rapson.
By
Attorney

UNITED STATES PATENT OFFICE.

FREDERICK LIONEL RAPSON, OF LIVERPOOL, ENGLAND.

LIFTING-JACK AND THE LIKE FOR USE ON MOTOR ROAD AND OTHER VEHICLES.

1,354,338.     Specification of Letters Patent.     Patented Sept. 28, 1920.

Application filed June 11, 1919. Serial No. 303,410.

*To all whom it may concern:*

Be it known that I, FREDERICK LIONEL RAPSON, a subject of His Majesty the King of Great Britain, and resident of Childwall Hall, Liverpool, in the county of Lancaster, Kingdom of England, have invented certain new and useful Improvements in or Relating to Lifting-Jacks and the like for Use on Motor Road and other Vehicles, of which the following is a specification.

This invention relates to lifting jacks and the like for use on motor road and other vehicles, and refers to improvements in or modifications of the invention described in the specification of my prior application Serial Number 244,302.

In the above mentioned specification is described means for permanently attaching a self-contained jack element to a vehicle by a hinge or swivel joint so that the jack can be turned from a substantially horizontal position when not in use, to a vertical position when required to raise the vehicle or an adjacent wheel.

The object of the present invention is to provide a combination jack and axle fitting which will enable the above described swivel jacks to be positively locked in either a vertical or a substantially horizontal position, and further to construct the axle fittings so that a standardized jack can be fitted to either the front or back axle of a motor car.

The invention will now be described with reference to the accompanying drawings, in which:—

Fig. 2 is a sectional side elevation of one form of front axle fitting showing the locking arrangement for the swivel jack;

Fig. 3 is a perspective view thereof with the jack detached from the fitting;

Fig. 4 is a side elevation of a modified form of jack element and a back axle fitting therefor;

Fig. 5 is a sectional plan therefor;

Fig. 6 is a longitudinal sectional elevation of the preferred form of jack element shown in Figs. 4 and 5 and part of the operating handle therefor;

Fig. 7 is a sectional elevation taken on the line *a—a* of Fig. 5;

Fig. 8 is a similar view to Fig. 3 showing a further modified form of locking device for a swivel jack; and Fig. 9 is a sectional plan thereof.

Figure 1:
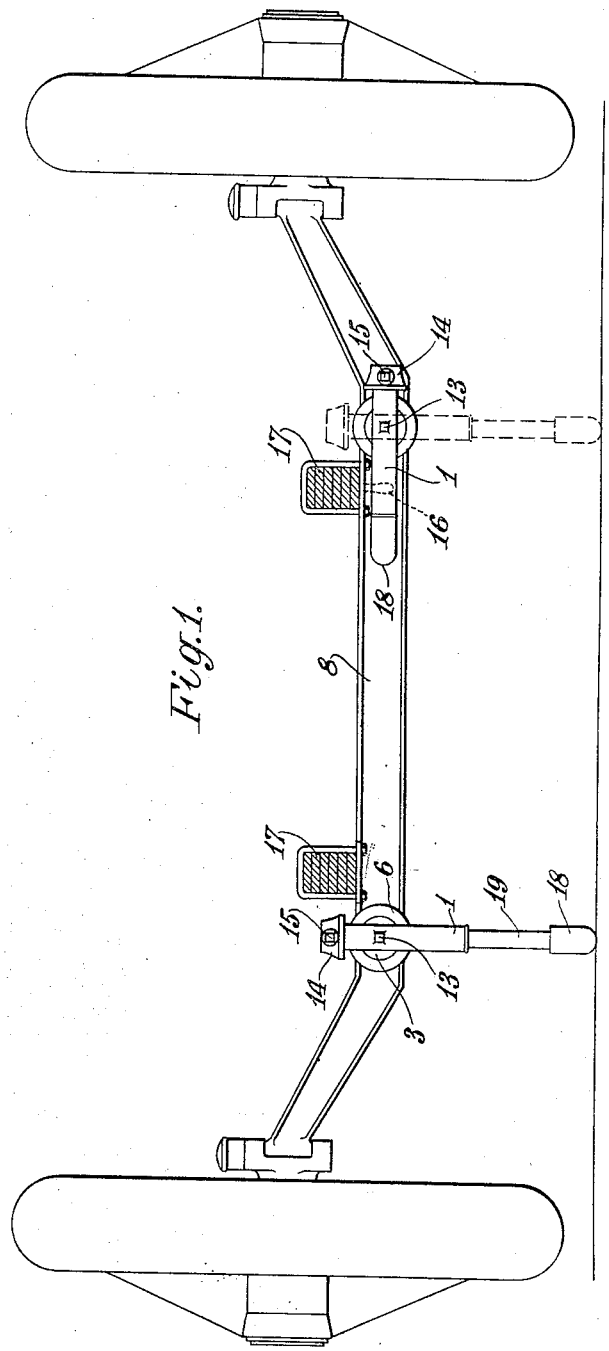
Figure 1 is a view of the front axle of a motor car showing one jack in its operative and the other jack in its inoperative position, the operative position of the latter being shown in dotted lines.

In one form of this invention, as shown more particularly in Figs. 1 to 3, the body 1 of a jack element of any suitable type is provided or formed with an outwardly projecting lug or extension 2 which is threaded to receive a disk 3 integrally formed with a plurality of, preferably four, lugs or extensions 4. This disk 3 is clamped onto the jack by lock nuts 5. The disk 3 is adapted to rotate within a circular fitting 6 which is provided with rearwardly extended screwed extensions 7 which are arranged above and below the front axle 8 of the vehicle. This fitting 6 is secured to the axle 8 by a rear plate 9 which is bolted on the extensions 7 by nuts 10 screwed thereon. Between the rear side of the disk 3 and the axle 8 is disposed a strong coiled spring 11 which is adapted to normally hold the lugs or extensions 4 of the disk 3 in similarly shaped holes or recesses 12 formed in the rear face of the fitting 6. The body 1 of the jack is formed with a squared extension 13 which is disposed at the opposite side of the body to the lug or extension 2. This squared extension 13 is adapted to receive the box shaped end of a brace handle or other operating device. The upper end of the body 1 of the jack element is enlarged at 14 to provide a casing for the operating bevel wheels. These bevel wheels are adapted to be actuated to operate the jack by the brace handle engaging on a squared extension 15. If desired, a suitable U or V shaped spring clip 16 covered with rubber or other suitable material, may be provided on the spring 17 of the vehicle to further hold the jack in its inoperative position and prevent rattling during the running of the car. It will be understood that the swivel connection and locking means of the jack may be disposed at any convenient part of the length thereof or at its upper end.

In operation and when it is desired to turn the jack from its normally horizontal or inoperative position to its operative or vertical position, the operating or brace handle is placed on the extension 13 and is forced inward to move the lugs or extensions 4 out of engagement with the holes or recesses 12 against the action of the spring 11. The brace handle is then rotated to turn the jack through an angle of 90 degrees. When the pressure is relieved on the handle the spring 11 will force the lugs 4 into the recesses 12 and thus the jack will be locked in its vertical or operative position. The jack can then be actuated by placing the operating or brace handle on the squared extension 15 and rotating the same in the usual manner to lower the curved foot 18 which is attached to the internally threaded sleeve 19 on to the ground to raise the vehicle or an adjacent wheel therefrom. It will be understood that the thrust or pressure on the brace handle when raising the car will not tend to disengage the locking mechanism, as only the direct central thrust on the squared extension 13 can achieve this.

In a modified construction as shown in Figs. 4 to 7, a lever 20 is pivotally mounted on the side of the body 1 of the jack element. Between the inner end of this lever 20 and the lug or extension 2 of the body 1 of the jack is disposed a coiled compression spring 21 which is adapted to force this end of the lever into one of a pair of slots 22 cut in the circular fitting 6. The jack is rotatably mounted on the fitting 6 and bolted by lock nuts or a nut 5 screwed onto the lug 2 which is rotatably mounted in the fitting 6. The fitting 6 in this case is formed with a substantially semicircularly shaped extension 23 to engage with the rear axle. The rear plate 9 is also semicircularly shaped and bolts 24 are passed through holes in lugs 25 formed on the shaped members 9 and 23. Thus I provide a fitting by which the jack element can be secured to the rear axle of the vehicle. The outer end of the lever 20 is curved and adapted to lie adjacent to one side of the squared extension 13 formed on the body 1 of the jack. When the box shaped end 26 of the brace handle is placed over the squared extension 13 the conical face 27 will force the outer end of the lever 20 outward and allow its inner end to disengage from one of the recesses 22 in the fitting 6. The brace handle can now be rotated to turn the jack element from its normally horizontal position to its vertical or operative position or vice versa. When the brace handle is withdrawn the lever 20 will be operated by its spring 21 to engage in the other recess in the fitting 6 and thus the jack will be locked in its other position. The foot 18 of the jack can now be lowered by placing the brace handle on the squared extension 15 and rotating the same. In this instance the rotation of the extension 15 will turn the worm 28 mounted in a casing 29 formed on the side of the body 1 of the jack. This worm 28 is adapted to coöperate with a pinion 30 secured on the upper end of the screwed rod 31 depending into the body 1 of the jack. This screw rod 31 is adapted to coöperate with the internally screwed sleeve 19 slidably mounted in the body 1 of the jack. It will be understood that any form of jack element may be employed.

In another modified construction as shown in Figs. 8 and 9, the lever 20 is mounted in the disk 3 which is rotatably mounted in the fitting 6. The fitting 6 is formed, as in the previous construction, with a pair of holes or recesses 22 and the fitting is provided with a cover plate 32. A curved slot 33 is formed in this cover plate for the reception of the end of a plunger rod 34, which rod 34 is adapted to contact with the end of the lever 20. If desired a dust-proof plate 35 may be slidably mounted on the extension 2 of the body 1 of the jack, to normally close the curved slot 33 and render the device dust-proof. The outer end of the plunger rod 34 is slidably mounted in suitable guides and arranged adjacent to the squared extension 13. Thus when the brace handle is placed over the extension 13 and forced inward, the plunger rod 34 is moved to turn the lever 20 on its pivot against the action of the spring 21 to disengage the outer end of the lever 20 from one of the slots 22 in the fitting 6. The handle can now be rotated to turn the jack through the desired angle into its operative or inoperative position as desired. When the brace handle is removed the spring 21 will force the lever 20 into the other recess 22 and thus the device will be locked in its other position. The handle can now be placed over the squared extension 15 to operate the jack in the usual manner.

If desired plunger rods and locking levers may be arranged each side of the jack so that when the operating handle is forced onto the squared extension a pair of locking devices will be disengaged. In this instance the fitting 6 will be formed with two pairs of recesses or slots.

When the jack is attached to the rear axle, which is normally in a higher position from the ground than the front axle, the sleeve 19 of the jack may be provided with an extension to make up for this difference in height or the swivel and locking device may be secured below the rear axle and attached thereto by split clamp rings adapted to embrace the said axle. Thus the height of the swivel pin will be brought lower to agree with that of the jacks on the front axle.

It will be understood that the inoperative position of the jacks need not always be horizontal; for instance, when attached to the rear axle the petrol tank may prevent the jack assuming this position. In this case the jacks are locked in an angular position and as near as possible to the horizontal position.

What I claim is:—

1. A lifting jack, means carried by a fixed part of the vehicle and forming a mounting on which the jack is rotatably supported, an automatically operated lever mechanism coöperating with said mounting for locking the jack in both operative and inoperative positions with respect to the vehicle.

2. A lifting jack for vehicles including a supporting means adapted to be secured to a fixed part of the vehicle, a jack rotatably mounted with relation to said supporting means, a spring pressed locking lever to automatically secure the jack in either one of a plurality of positions relative to the supporting means, and means for operating said lever to release the jack for rotative movement with respect to this supporting means.

3. A lifting jack for vehicles comprising a support for the jack adapted to be secured to a fixed part of the vehicle, a jack rotatably mounted in said support, means for automatically locking the jack in either one of two positions relative to the support, and a projection carried by the jack to receive an implement for turning the jack in its support, said locking means being engaged and operated by said implement in its application to the projection.

4. A vehicle jack adapted for rotative movement with respect to a fixed part of the vehicle, a projection on the jack to receive a tool for rotating the jack, and lever mechanism for locking the jack in either one of two positions with respect to said fixed part of a vehicle, said lever mechanism being actuated to release the locking means in the application of the tool to said projection.

5. A vehicle jack including a support to be removably secured to a fixed part of the vehicle, said support being formed with locking notches, a jack rotatably mounted in said support, and lever mechanism automatically operative to engage either of said notches to lock the jack in predetermined relation to said support.

6. A vehicle jack including a support to be removably secured to a fixed part of the vehicle, said support being formed with locking notches, a jack rotatably mounted in said support and formed with a projection to receive a tool for turning the jack in its support, a spring operated lever to engage either of said notches to lock the jack in predetermined relation to the support, said tool operating to disengage the lever from said notches to release the jack in the application of said tool to the projection.

In testimony whereof I have hereunto signed my name.

FRED. LIONEL RAPSON.